(12) United States Patent
Lim

(10) Patent No.: US 10,363,777 B2
(45) Date of Patent: Jul. 30, 2019

(54) VEHICLE WHEEL

(71) Applicant: JITI LOGISTICS CO., LTD., Seo-gu, Gwangju (KR)

(72) Inventor: Chae Hong Lim, Gwangju (KR)

(73) Assignee: JITI LOGISTICS CO., LTD. (KR)

(*) Notice: Subject to any disclaimer, the term of this patent is extended or adjusted under 35 U.S.C. 154(b) by 130 days.

(21) Appl. No.: 15/505,693

(22) PCT Filed: Aug. 29, 2016

(86) PCT No.: PCT/KR2016/009566
§ 371 (c)(1),
(2) Date: Feb. 22, 2017

(87) PCT Pub. No.: WO2017/142146
PCT Pub. Date: Aug. 24, 2017

(65) Prior Publication Data
US 2018/0104984 A1    Apr. 19, 2018

(30) Foreign Application Priority Data

Feb. 19, 2016  (KR) .................. 10-2016-0019501

(51) Int. Cl.
*B60B 21/02*     (2006.01)
*B60B 21/10*     (2006.01)
*B60B 3/00*      (2006.01)

(52) U.S. Cl.
CPC ............ *B60B 21/023* (2013.01); *B60B 21/02* (2013.01); *B60B 21/026* (2013.01); *B60B 21/10* (2013.01);
(Continued)

(58) Field of Classification Search
CPC ..... B60B 21/02; B60B 21/023; B60B 21/026; B60B 21/028; B60B 21/102; B60B 21/10
See application file for complete search history.

(56) References Cited

U.S. PATENT DOCUMENTS

| | | | |
|---|---|---|---|
| 3,172,787 A | * | 3/1965 | Martenet ................ B21D 53/30 148/535 |
| 6,364,425 B1 | | 4/2002 | Marquis |

(Continued)

FOREIGN PATENT DOCUMENTS

| | | |
|---|---|---|
| DE | 10393170 T5 | 12/2005 |
| JP | 08-230402 | 9/1996 |

(Continued)

OTHER PUBLICATIONS

Extended European Search Report for EP Application No. 16834268.1, dated Dec. 22, 2017.

(Continued)

*Primary Examiner* — Kip T Kotter
(74) *Attorney, Agent, or Firm* — Schmeiser, Olsen & Watts, LLP

(57) ABSTRACT

Provided is a vehicle wheel. The vehicle wheel disclosed herein includes a disc member to which an axle is connected, and a rim portion connected to the disc member and on which a tire is mounted. The rim portion includes a first tire mounting portion connected to the disc member and including a first bead seat coming into contact with an outer bead of the tire, a second tire mounting portion located including a second bead seat coming into contact with an inner bead of the tire, and a well portion including an outer well portion extending from the first tire mounting portion, and an inner well portion configured to connect the outer well portion to the second tire mounting portion, and wherein a thickness is formed to be thinner in an order of the outer well portion, the second bead seat, and the inner well portion.

9 Claims, 14 Drawing Sheets

(52) U.S. Cl.
CPC .............. *B60B 21/102* (2013.01); *B60B 3/00* (2013.01); *B60B 2900/111* (2013.01); *B60B 2900/131* (2013.01); *B60B 2900/133* (2013.01); *B60B 2900/311* (2013.01); *B60B 2900/521* (2013.01); *Y02T 10/86* (2013.01)

(56) References Cited

U.S. PATENT DOCUMENTS

| | | | | |
|---|---|---|---|---|
| 2004/0124695 | A1* | 7/2004 | Guimard | B21D 53/30 301/95.101 |
| 2005/0253447 | A1* | 11/2005 | Abe | B21D 53/30 301/95.108 |
| 2011/0101770 | A1* | 5/2011 | Brame | B60B 3/044 301/95.101 |

FOREIGN PATENT DOCUMENTS

| | | |
|---|---|---|
| JP | 2002234304 A | 8/2002 |
| JP | 2004082810 A | 3/2004 |
| JP | 2004522636 A | 7/2004 |
| JP | 2007186150 A | 7/2007 |
| JP | 2001039101 | 2/2013 |
| KR | 1019990062973 A | 7/1999 |
| KR | 1 02001 0072401 A | 7/2001 |
| KR | 20060044653 A | 5/2006 |
| KR | 1020070053386 A | 5/2007 |
| KR | 20080038312 A | 5/2008 |
| WO | 2005/063504 A1 | 7/2005 |

OTHER PUBLICATIONS

Japanese language Office Action for JP Application No. 2017-511946, dated Mar. 20, 2018.

* cited by examiner

- Prior Art -

US 10,363,777 B2

VEHICLE WHEEL

CROSS-REFERENCE TO RELATED APPLICATIONS

This application is a continuation application to PCT/KR2016/009566, having a filing date of Aug. 29, 2016, based on KR 10 2016 0019501, having a filing date of Feb. 19, 2016, the entire contents of which are hereby incorporated by reference.

FIELD OF TECHNOLOGY

The following relates to a vehicle wheel, and more particularly, to a vehicle wheel capable of reducing noise and vibration while a vehicle is driving, and securing stiffness.

BACKGROUND

Generally, a vehicle wheel is configured with material including steel, aluminum, and the like. Such a vehicle wheel is fixed to a wheel hub of a vehicle, which is configured with a brake drum or a brake disc.

To improve fuel efficiency of a vehicle, lightweight material including aluminum and the like, or a design change in which a thickness is reduced is applied to a vehicle wheel.

Typically, when a vehicle wheel is designed, a structure including a hub mounting portion, a spoke portion, and the like is designed to satisfy a predetermined strength condition, and then slimming is performed on the hub mounting portion, an inside of the spoke portion, and the like so as to reduce a weight.

There is a problem in that vibration and noise occur at a vehicle wheel when the vehicle is driving due to lack of stiffness as a weight of the vehicle wheel is reduced, and the hub mounting portion, the inside of the spoke portion, and the like are reinforced so as to prevent such vibration and noise, and further, when an overall shape of the vehicle wheel is thicker, there is problem in that the weight is increased again.

Technology in which a hollow chamber is formed at a rim to reduce a weight and noise is prevented is disclosed in Korean Patent Application Publication No. 10-2006-0044653 (hereinafter, referred to as 'Known Art Document 1').

Technology in which a hollow is formed at a rim and a spoke is disclosed in Korean Patent Application Publication Nos. 10-2007-0053386 and 10-1999-0062973 in addition to Known Art Document 1, and a method of forming the hollow chamber is effective to reduce a weight and absorb a sound but there is a problem in that the method is vulnerable to durability.

Also, technology in which a hollow chamber is formed at a rim and then an aluminum foaming core is filled in the hollow chamber to absorb vibration and noise is disclosed in Korean Patent Application Publication No. 10-2007-0053386 (hereinafter, referred to as 'Known Art Document 2'). Technology in which a hollow chamber is formed at a rim and a spoke and then an aluminum foaming core is filled in the hollow chamber has a higher effect in a sound absorption compared to Known Art Document 1, but there is a problem in that an effect in a weight reduction is limited.

Such a conventional vehicle wheel, as shown in FIGS. 1 and 2, includes a rim portion 3 formed to extend from an outer circumferential surface of a disc member 2 in one direction, and a tire 1 is mounted on an outer circumferential surface of the rim portion 3 as shown in FIG. 2.

That is, an outer bead 1a of one end of beads 1a and 1b at both ends of the tire 1 is seated on an outer bead seat 3a of the rim portion 3 configuring an outer surface of the disc member 2, and an inner bead 1b of the other end is seated on an inner bead seat 3b formed at a free end of the rim portion 3.

Meanwhile, the rim portion 3 is formed such that a thickness of a well portion 31 protruding from the disc member 2 is different from that of the inner bead seat 3b, the well portion 31 includes an outer well portion 31a formed to extend from the outer bead seat 3a and an inner well portion 31b formed to extend from the inner bead seat 3b and connected to the outer well portion 31a, and the inner well portion 31b is formed to be inclinedly bent from the outer well portion 31a to an outward side.

In a thickness of each of the well portion 31 and the inner bead seat 3b, which are formed as described above, the inner bead seat 3b provided with the inner bead 1b of the tire 1 is formed to have a largest thickness, the outer well portion 31a extending and protruding from the outer bead seat 3a is formed to have a next thick thickness, and the inner well portion 31b between the outer well portion 31a and the inner bead seat 3b is formed to have a smallest thickness.

The vehicle wheel formed as described above receives a load corresponding to a weight of a vehicle when the vehicle is driving through a road surface, and loads F1 and F2 delivered to the vehicle wheel are delivered through both beads 1a and 1b of the tire 1 as shown in FIG. 2.

As shown in FIG. 2, however, the loads F1 and F2, which are delivered through the tire 1, respectively act on the outer bead seat 3a of the rim portion 3 through the outer bead 1a of the tire 1 and on the inner bead seat 3b of the rim portion 3 through the inner bead 1b of the tire 1, and reaction forces R1 and R2 against the loads F1 and F2 respectively act on the outer bead seat 3a and the inner bead seat 3b of the tire 1.

Particularly, the reaction force R2 against the load F2, which acts on the inner bead seat 3b of the rim portion 3, acts as a reaction force R2' transferred to the outer well portion 31a having one end connected to the outer bead seat 3a.

Therefore, the reaction force R1 linearly acts against the load F1 in an opposite direction to serve an action and a reaction with respect to the load F1 acting on the outer bead seat 3a, whereas the reaction force R2 against the load F2 is transferred as the reaction force R2' of the outer well portion 31a and thus the reaction force R2' acts against the load F2 acting on the inner bead seat 3b.

Consequently, since an amount of deformation ε1 occurs at the inner bead seat 3b and a thickness of the outer well portion 31a is relatively thinner than that of the inner bead seat 3b so that a supporting surface as a fixed end portion is small, there are problems in that deformation occurs from the fixed end portion of the outer well portion 31a such that an entire amount of deformation ε1 becomes large, and vibration corresponding to the amount of deformation ε1 is delivered to a hub (not shown) of the vehicle through a spoke portion 22 of the vehicle wheel to be generated as vibration and noise of the vehicle without a loss. Therefore, there is a need to address such problems.

SUMMARY

An aspect relates to a vehicle wheel capable of reducing vibration and noise, which are delivered to a vehicle, by differently configuring a thickness of each of an outer well portion, an inner well portion, and a second bead seat which form a rim portion.

Also, another aspect is to provide a vehicle wheel capable of minimizing an amount of deformation of a rim portion by inclinedly forming an inner well portion, which extends from an outer well portion, in a multi-stepped shape.

Technical Solution

A vehicle wheel according to the present embodiment includes a disc member to which an axle is connected, and a rim portion connected to the disc member and on which a tire is mounted, wherein the rim portion includes a first tire mounting portion connected to the disc member and including a first bead seat coming into contact with an outer bead of the tire; a second tire mounting portion located and spaced apart from the first tire mounting portion and including a second bead seat coming into contact with an inner bead of the tire; and a well portion including an outer well portion extending from the first tire mounting portion, and an inner well portion configured to connect the outer well portion to the second tire mounting portion, and wherein a thickness is formed to be thinner in an order of the outer well portion, the second bead seat, and the inner well portion.

In the present disclosure, the first tire mounting portion further includes a first movement restriction portion protruding from the first bead seat and configured to come into contact with the outer bead to restrict movement of the outer bead; and a well wall portion extending from the first bead seat or the first movement restriction portion and connected to the outer well portion.

In the present disclosure, the first movement restriction portion includes a first rim flange protruding from the first bead seat and configured to come into contact with an outside of the outer bead to restrict movement of the outer bead in an outward direction; and a first hump protruding from the first bead seat and configured to come into contact with an inside of the outer bead to restrict movement of the outer bead in an inward direction.

In the present disclosure, the second tire mounting portion further includes a second movement restriction portion protruding from the second bead seat and configured to come into contact with the inner bead to restrict movement of the inner bead.

In the present disclosure, the second movement restriction portion includes a second rim flange protruding from the second bead seat and configured to come into contact with an outside of the inner bead to restrict movement of the inner bead in an outward direction; and a second hump protruding from the second bead seat and configured to come into contact with an inside of the inner bead to restrict movement of the inner bead in an inward direction.

In the present disclosure, the thickness of the outer well portion is 1.2 to 1.8 times that of the second bead seat.

In the present disclosure, the thickness of the outer well portion is 1.2 to 2.5 times that of the inner well portion.

In the present disclosure, the thicknesses of the outer well portion, the inner well portion, the second bead seat are 6.0 to 9.1 mm, 3.3 to 5.5 mm, and 4.0 to 7.5 mm, respectively.

In the present disclosure, the thickness of the inner well portion is greater than a thickness difference between the outer well portion and the second bead seat.

In the present disclosure, the inner well portion is formed to be inclined in an outward direction of the outer well portion based on a rotational center of the disc member.

In the present disclosure, the inner well portion is inclinedly formed in multi-stepped stages.

In the present disclosure, the inner well portion includes a first inclined portion formed to be inclined from the outer well portion to the second bead seat; and a second inclined portion formed to be inclined from the second bead seat to the first inclined portion and connected to the first inclined portion.

In the present disclosure, a slope angle of the first inclined portion is in a range of 5 to 25 degrees.

In the present disclosure, a slope angle of the second inclined portion is in a range of 5 to 15 degrees.

Advantageous Effects

In accordance with the vehicle wheel of the present disclosure, each of the outer well portion, the inner well portion, and the second bead seat is configured with a different thickness, and the inner well portion extending from the outer well portion is inclinedly formed in multi-stepped stages such that an amount of deformation of the rim portion may be minimized and further vibration and noise, which are delivered to a vehicle body, may be reduced to thereby improve a ride comfort.

Also, in accordance with the present disclosure, there are effects in which stiffness of the rim portion is improved and at the same time a weight is reduced.

BRIEF DESCRIPTION

Some of the embodiments will be described in detail, with reference to the following figures, wherein like designations denote like members, wherein:

FIG. 12 is a graph illustrating a vibration frequency of a handle at a driver seat;

DETAILED DESCRIPTION

Figure 1:
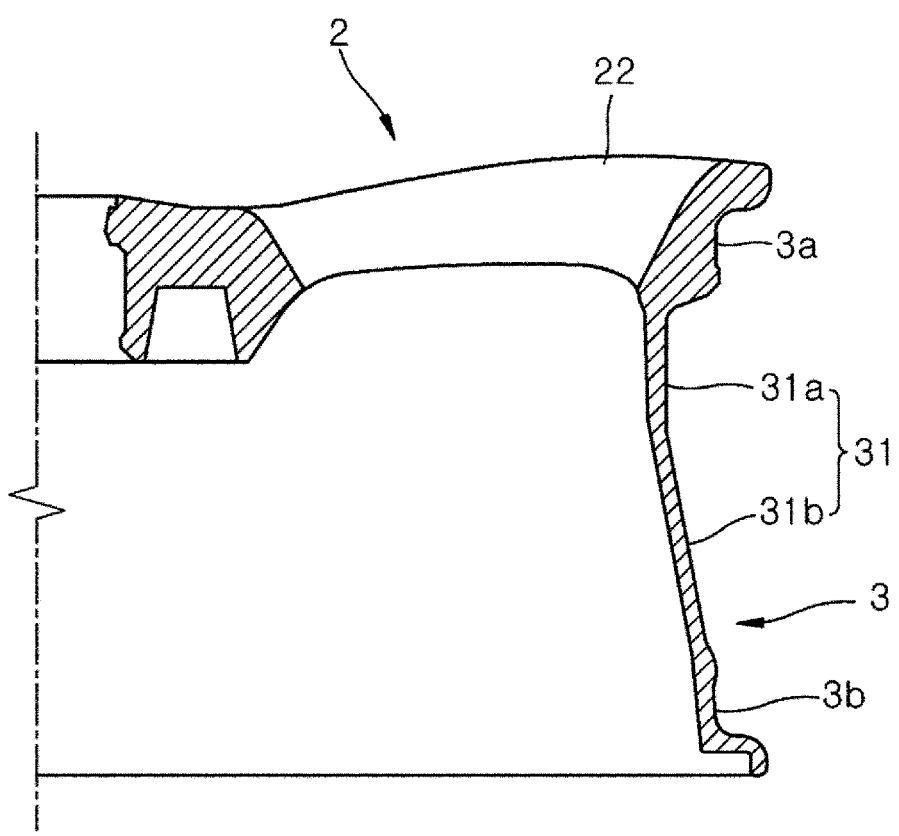
FIG. 1 is an enlarged diagram illustrating a rim portion of a vehicle wheel according to the related art.
Figure 2:
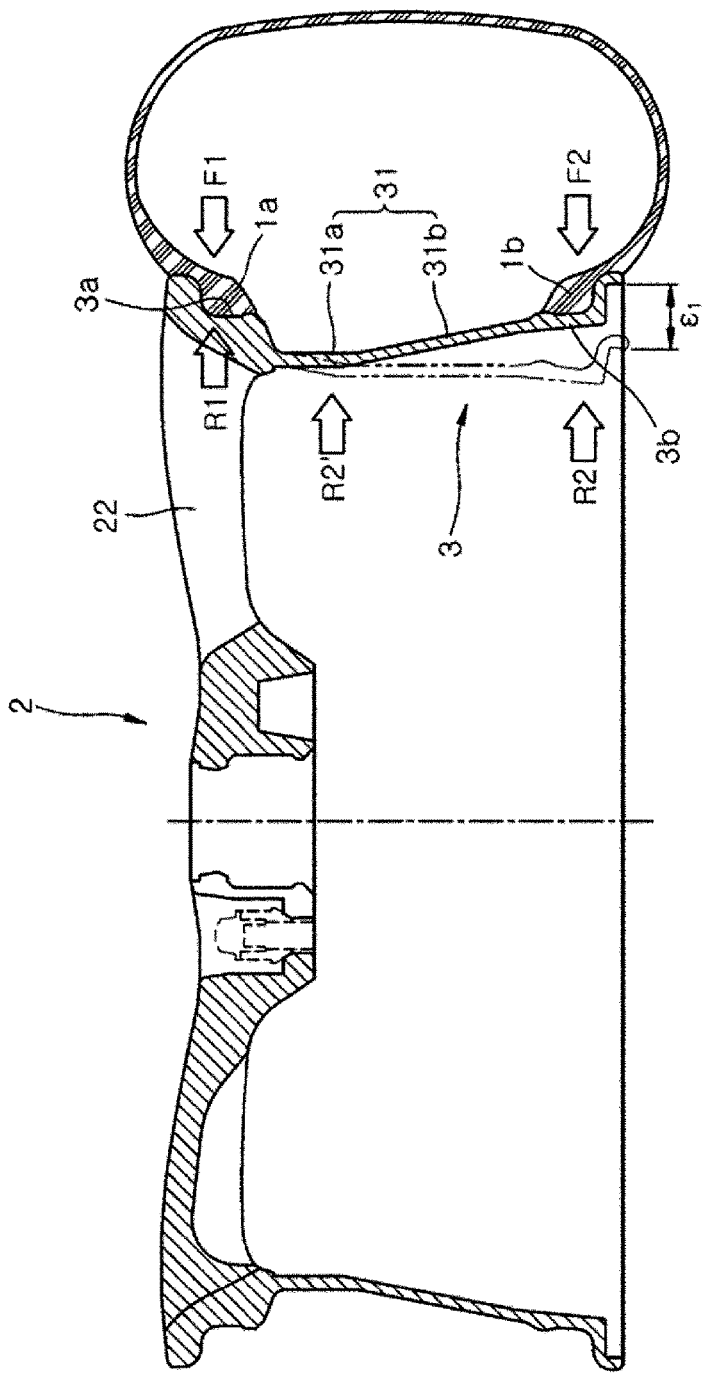
FIG. 2 is a diagram illustrating a relationship of forces acting on the rim portion of the vehicle wheel according to the related art.

Hereinafter, one embodiment of a vehicle wheel according to the present disclosure will be described with reference to the accompanying drawings. In the following description, thicknesses of lines and sizes of components shown in the drawings may be exaggerated for clarity and convenience of explanation.

And, all terms used hereinafter are selected by considering functions in embodiments, and meanings thereof may be different according to a user, the intent of an operator, or custom. Therefore, the meanings of the terms used herein should follow contexts disclosed herein.

Figure 3:
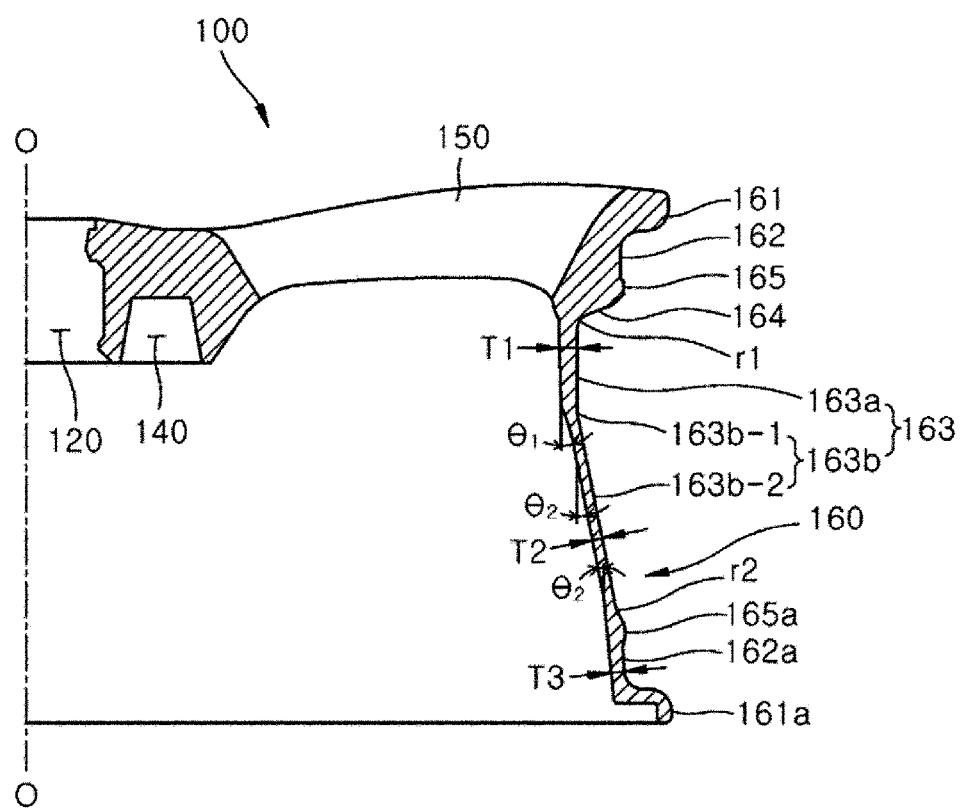
FIG. 3 is an enlarged diagram illustrating a rim portion of a vehicle wheel according to the present disclosure.
Figure 4:
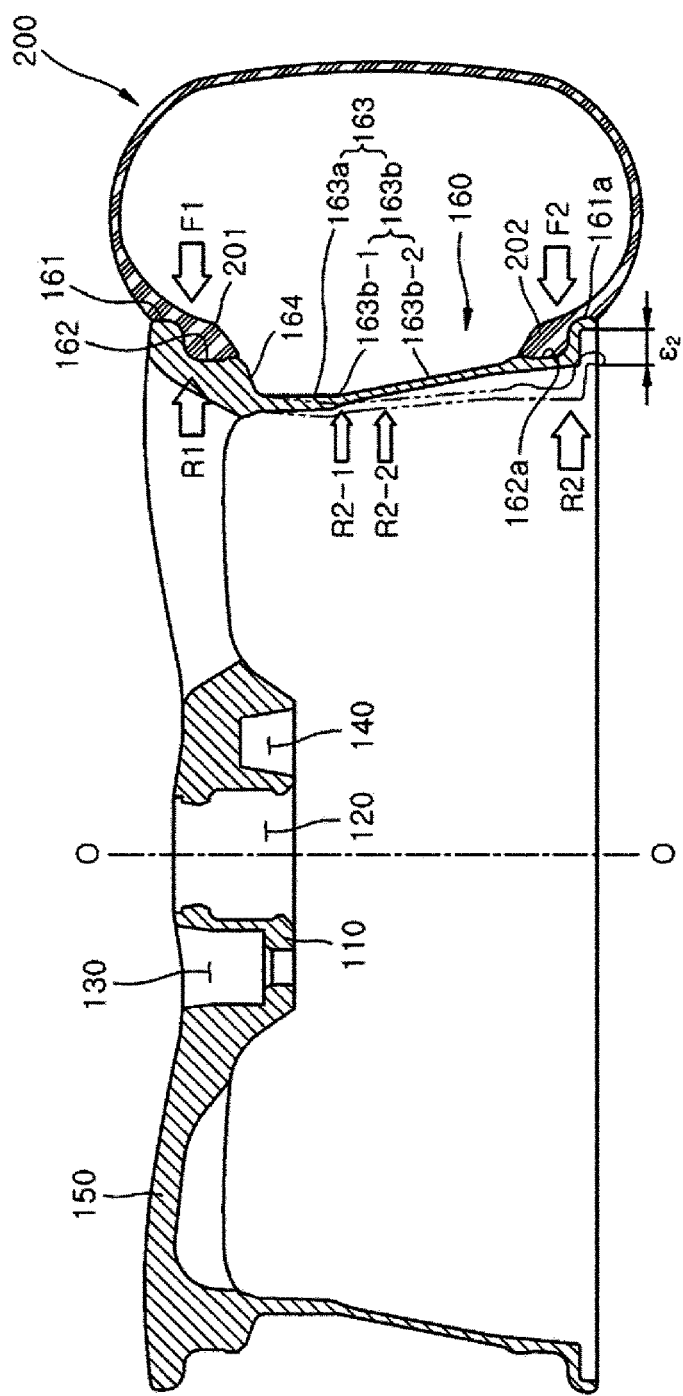
FIG. 4 is a diagram illustrating a relationship between forces acting on the rim portion of the vehicle wheel according to the present disclosure.
Figure 5:
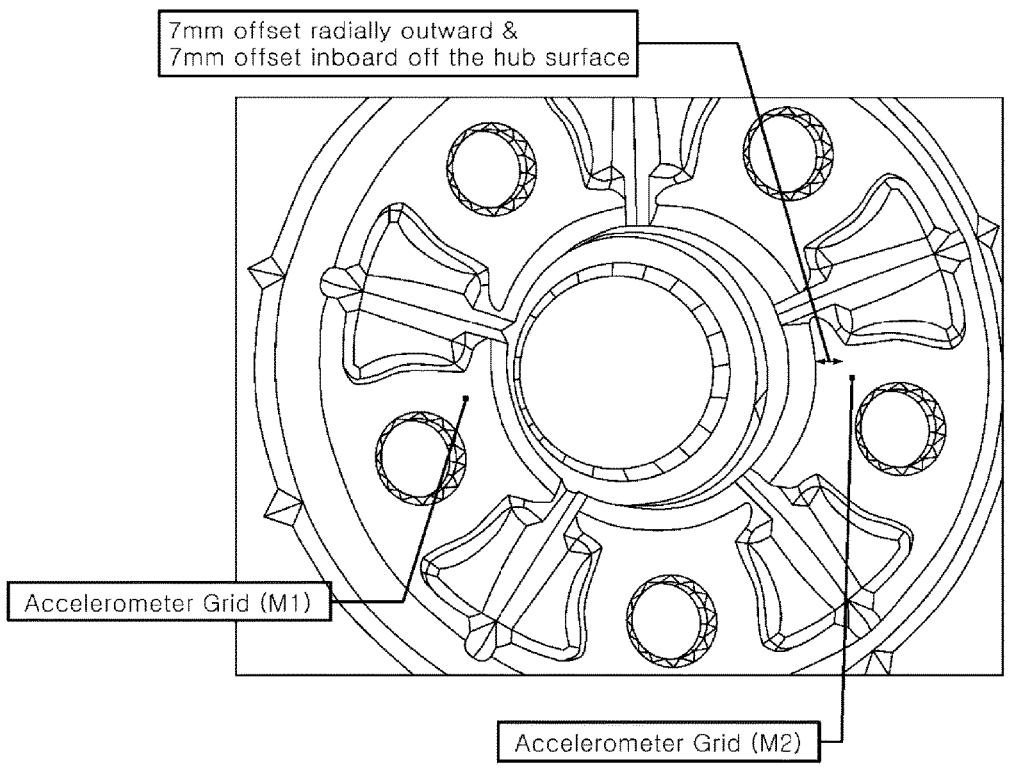
FIG. 5 is an installation state view of measurement sensors for a test of a frequency (vibration) response analysis of the rim portion of the vehicle wheel according to the present disclosure.

FIG. 3 is an enlarged diagram illustrating a rim portion of a vehicle wheel according to the present disclosure, FIG. 4 is a diagram illustrating a relationship between forces acting on the rim portion of the vehicle wheel according to the present disclosure, and FIG. 5 is an installation state view of measurement sensors for a test of a frequency (vibration) response analysis of the rim portion of the vehicle wheel according to the present disclosure.

Figure 6:
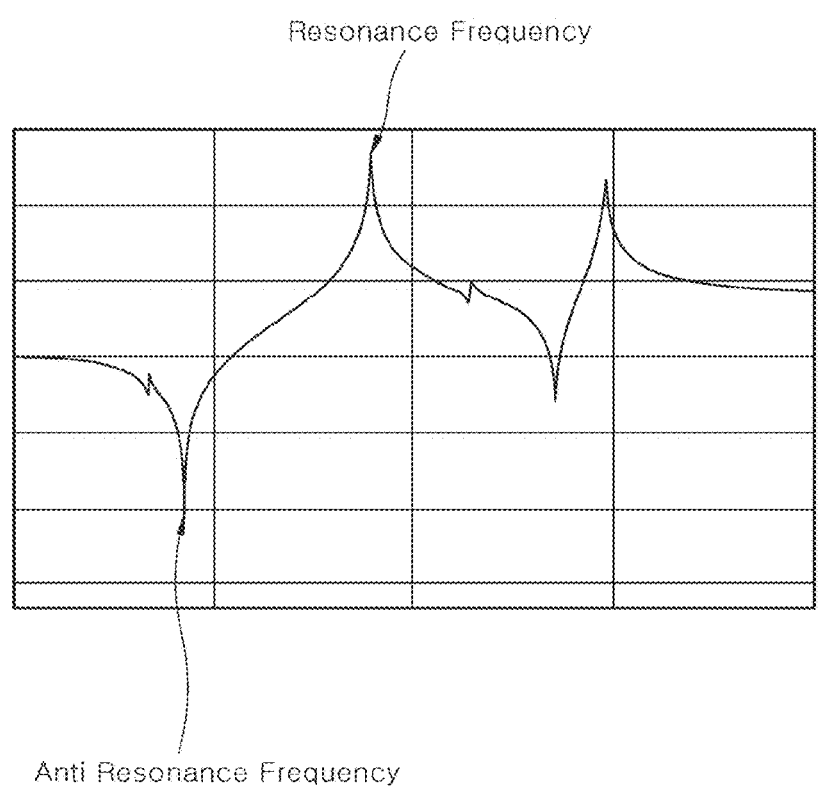
FIG. 6 is a graph illustrating a resonance frequency and an anti-resonance frequency according to a test result of FIG. 5.
Figure 7:
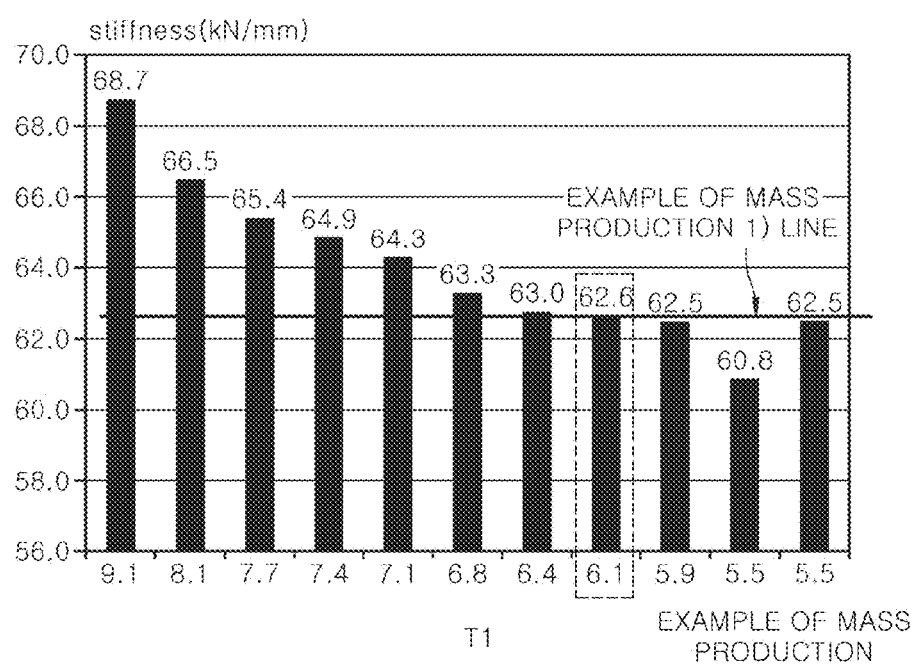
FIG. 7 is a graph of an analysis result of a threshold point with respect to an upper limit value of each of a thickness and a weight of the rim portion on the basis of the test result and the analysis of FIG. 5 is an analysis graph of a minimum threshold point with respect to a thickness of an outer well portion of the vehicle wheel.
Figure 8:
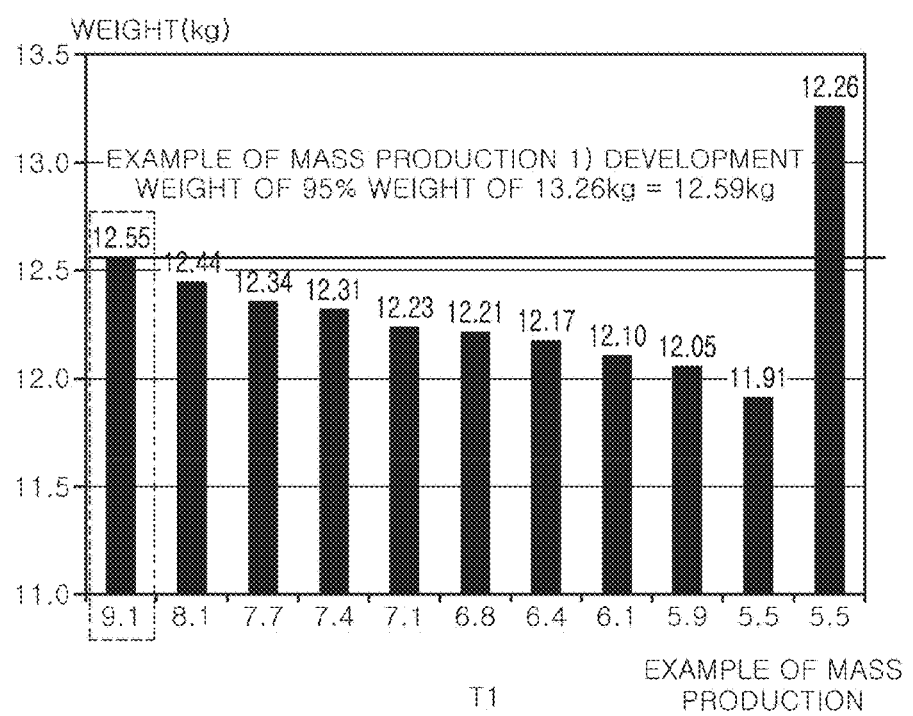
FIG. 8 is an analysis graph of a maximum threshold point according to a weight variance of the thickness of the outer well portion of the vehicle wheel.
Figure 9:
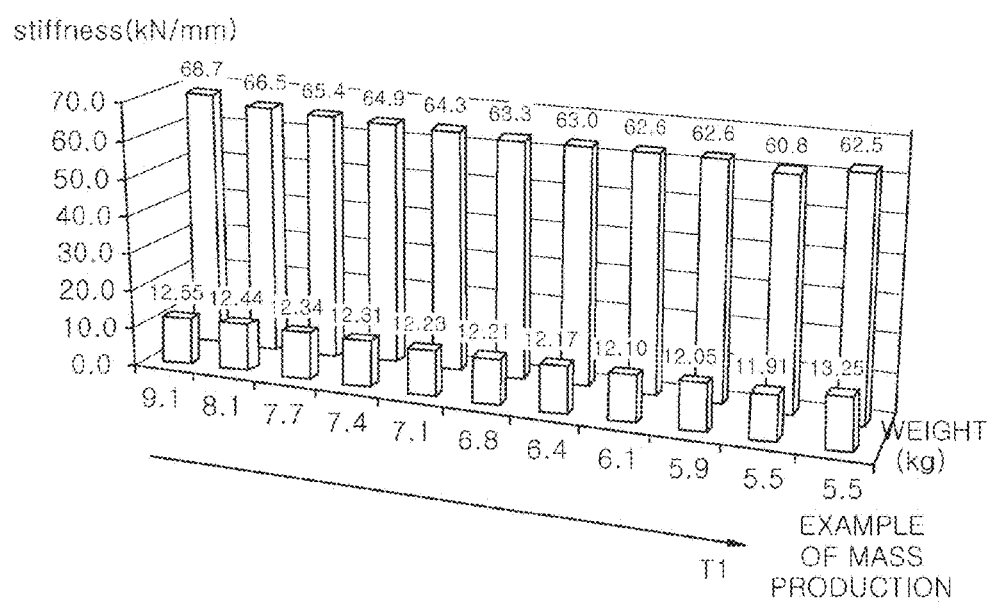
FIG. 9 is a graph illustrating a correlation between the thickness, a weight, and stiffness of the outer well portion of the vehicle wheel.

FIG. 6 is a graph illustrating a resonance frequency and an anti-resonance frequency according to a test result of FIG. 5, FIGS. 7 to 9 are graphs of an analysis result of a threshold point with respect to an upper limit value of each of a thickness and a weight of the rim portion on the basis of the test result and the analysis of FIG. 5, FIG. 7 is an analysis graph of a minimum threshold point with respect to a thickness of an outer well portion of the vehicle wheel, FIG. 8 is an analysis graph of a maximum threshold point according to a weight variance of the thickness of the outer well portion of the vehicle wheel, and FIG. 9 is a graph illustrating a correlation between the thickness, a weight, and stiffness of the outer well portion of the vehicle wheel.

Figure 10:
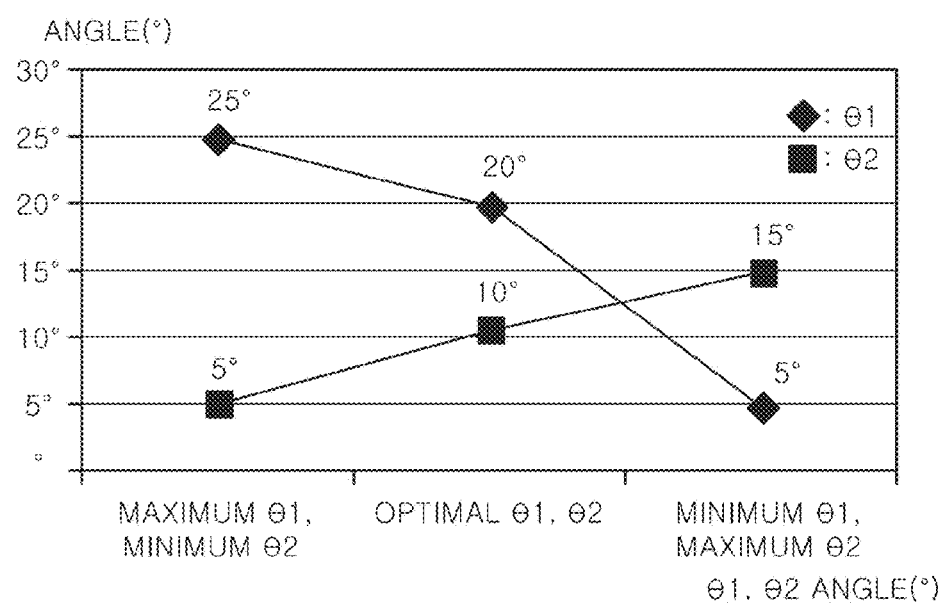
FIG. 10 is a graph illustrating a correlation between a first slope angle and a second slope angle of the vehicle wheel according to the present disclosure.
Figure 11:
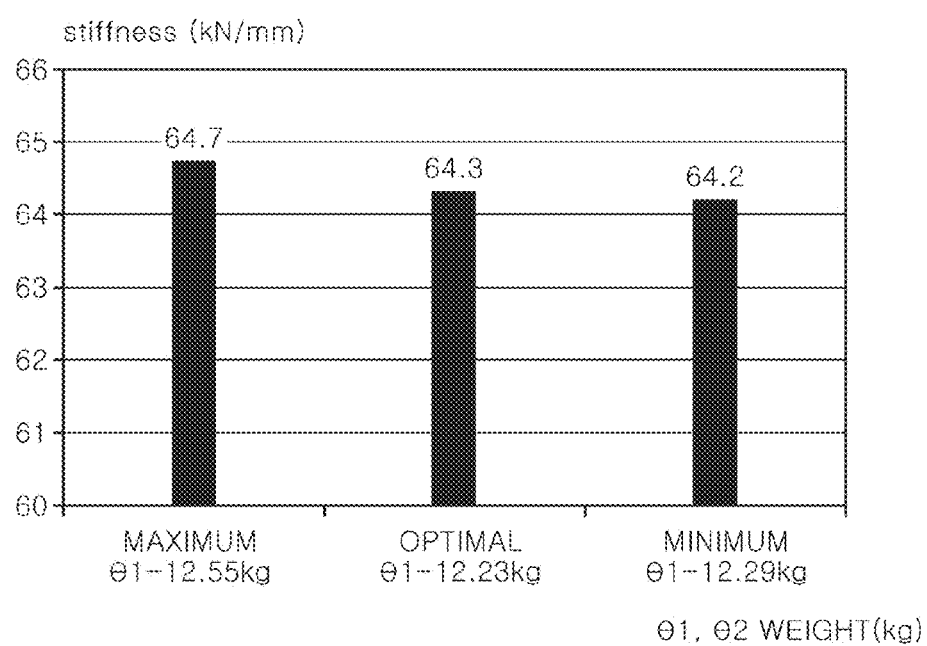
FIG. 11 is a graph illustrating a correlation between the first slope angle, the weight, and the stiffness of the vehicle wheel according to the present disclosure.

FIG. 10 is a graph illustrating a correlation between a first slope angle and a second slope angle of the vehicle wheel according to the present disclosure, and FIG. 11 is a graph illustrating a correlation between the first slope angle, the weight, and the stiffness of the vehicle wheel according to the present disclosure.

Figure 12:
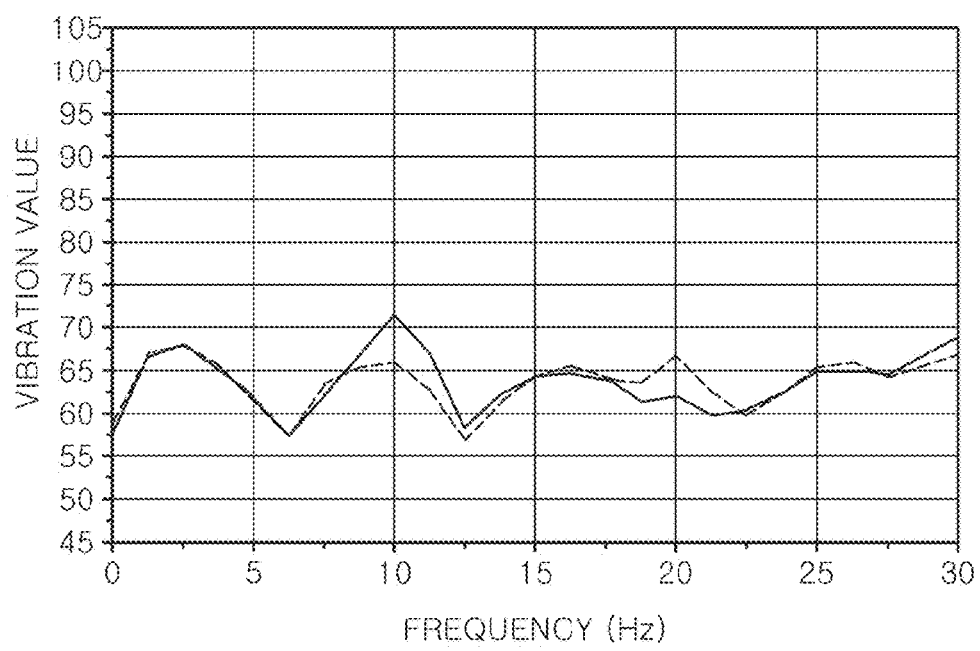
FIG. 12 is a diagram illustrating a vibration test measurement and analysis data obtained by respectively mounting the vehicle wheel according to the related art and the vehicle wheel according to the present disclosure on a vehicle.
Figure 13:
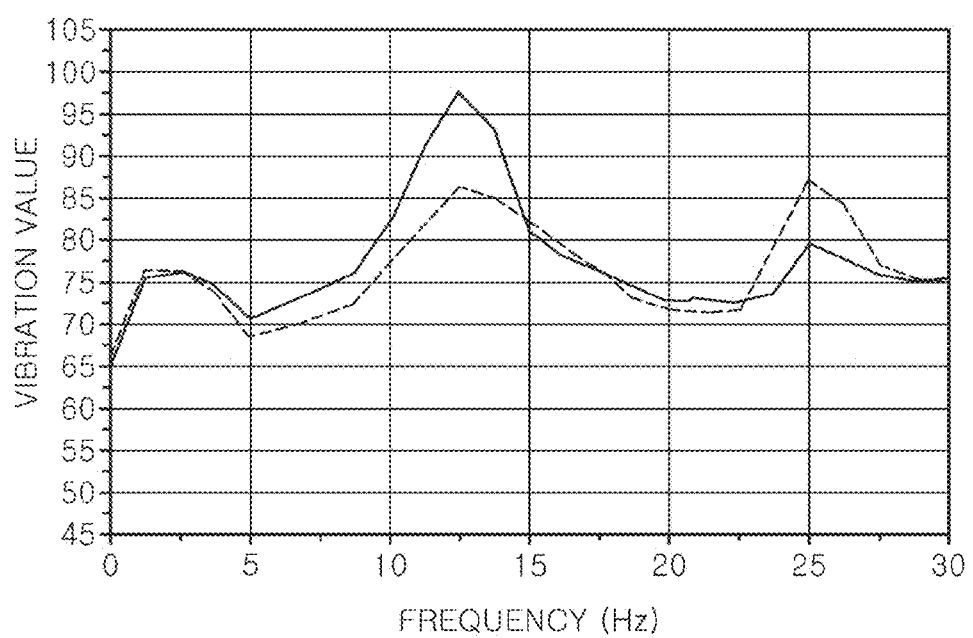
FIG. 13 is a graph illustrating a vibration frequency at a floor portion of the driver seat.
Figure 14:
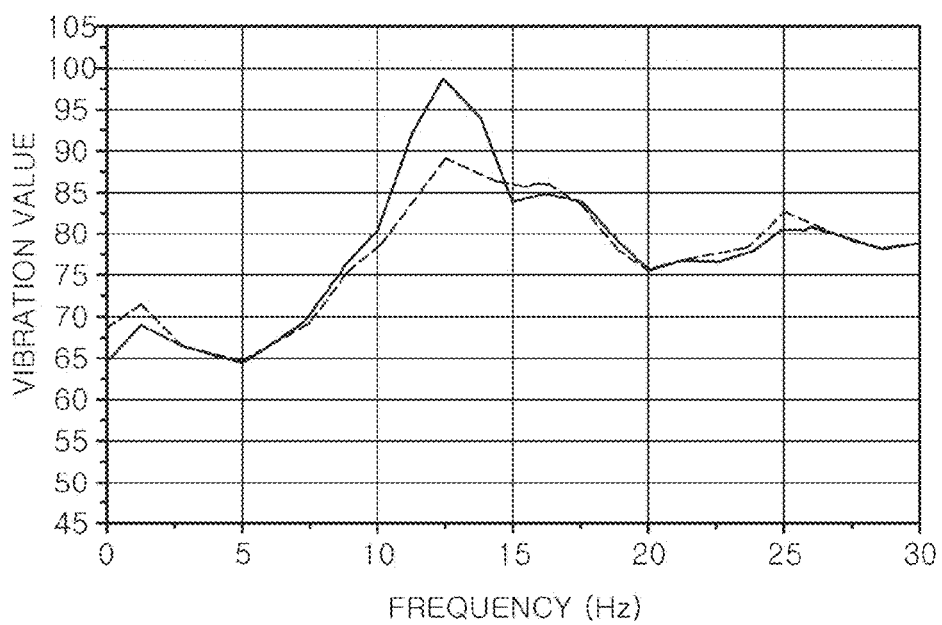
FIG. 14 is a graph illustrating a vibration frequency at a knuckle portion of the vehicle wheel.

FIGS. 12 to 14 are diagrams illustrating a vibration test measurement and analysis data obtained by respectively mounting the vehicle wheel according to the related art and the vehicle wheel according to the present disclosure on a vehicle, FIG. 12 is a graph illustrating a vibration frequency of a handle at a driver seat, FIG. 13 is a graph illustrating a vibration frequency at a floor portion of the driver seat, and FIG. 14 is a graph illustrating a vibration frequency at a knuckle portion of the vehicle wheel.

Referring to FIGS. 3 and 4, a vehicle wheel according to the present disclosure includes a disc member 100 provided to be connected to an axle hub (not shown), and a rim portion 160 formed to protrude from an outer circumferential surface of the disc member 100 and on which a tire 200 is mounted.

The disc member 100 includes a disc-shaped hub mounting portion 110 to which the axle hub is connected, and a spoke portion 150 formed to radially extend from an outside of the hub mounting portion 110 to the rim portion 160.

Particularly, as shown in FIGS. 3 and 4, the hub mounting portion 110 is formed in a solid form of which is entirely filled therein except for a bolt hole 130 and a hollow portion 140 which are designed for a bolt coupling with the axle hub.

This is because of enabling the vehicle wheel to have strength capable of bearing a weight and an impact load of a vehicle itself as a supporter of a part connected to the axle hub.

A hub hole 120 is formed at such a hub mounting portion 110 and the axle hub is inserted into a central portion of the hub mounting portion 110, and a plurality of bolt holes 130 are spaced apart from one another in regular intervals and arranged along a circumferential direction at the outside of the hub mounting portion 110 spaced apart from the hub hole 120.

Each of such bolt holes 130 is formed to have a diameter narrower from an outer lateral surface of the disc member 100 toward an inner lateral surface thereof, is provided to enable a nut or a cap nut to be inserted from the outer lateral surface of the disc member 100, and is fixedly coupled through coupling between a bolt of the axle hub passing through each of the bolt holes 130 at the inner lateral surface of the disc member 100 and the nut or the cap nut provided inside each of the bolt holes 130.

The hollow portion 140 is provided between the bolt holes 130, and a damper (not shown) configured with material including a rubber material may be inserted inside the hollow portion 140.

Such a hollow portion 140 is formed at the disc member 100 opposite to each of the bolt holes 130, that is, at the inner lateral surface of the disc member 100, and a diameter of the hollow portion 140 is formed to be narrower from the inner lateral surface of the disc member 100 toward a central portion thereof.

This is because of distributing and attenuating vibration and noise, which are generated from the vehicle wheel when the vehicle is driving, to the hollow portion 140 and the damper, each of which has the diameter increasing toward an inner end part of the disc member 100.

Also, the bolt hole 130 and the hollow portion 140 are formed to be opposite to each other, thereby mutually complementing the stiffness of the disc member 100. That is, a gap between the hub hole 120 and the bolt hole 130 is formed to be narrow at the outer lateral surface of the disc member 100, whereas the hub mounting portion 110 of the solid form in which the hollow portion 140 is not formed is employed such that the stiffness may be secured. Also, a gap between the hub hole 120 and the hollow portion 140 is formed to be narrow at the inner lateral surface of the disc member 100, whereas a gap between the hub hole 120 and the bolt hole 130 is formed to be wide such that the stiffness may be secured.

When the tire 200 is mounted on the rim portion 160 of the vehicle wheel, an annular sealed space is formed between the rim portion 160 and the tire 200.

As shown in FIGS. 3 and 4, the rim portion 160 of the present embodiment includes first tire mounting portions 161, 162, 164, and 165, second tire mounting portions 161a, 162a, and 165a, and a well portion 163, and a thickness is formed to be gradually thinner in the order of an outer well portion 163a, a second bead seat 162a, and an inner well portion 163b.

The first tire mounting portions 161, 162, 164, and 165 are connected to the disc member 100, and include a first bead seat 162 coming into contact with an outer bead 201 of the tire 200. In the present embodiment, the first tire mounting portions 161, 162, 164, and 165 include first movement restriction portions 161 and 165 and a well wall portion 164.

The first movement restriction portions 161 and 165 protrude from the first bead seat 162 and come into contact with the outer bead 201, thereby restricting movement of the outer bead 201. In the present embodiment, the first movement restriction portions 161 and 165 includes a first rim flange 161 and a first hump 165.

The first rim flange 161 protrudes from the first bead seat 162 and comes into contact with an outside of the outer bead 201, thereby restricting movement of the outer bead 201 in an outward direction.

The first hump 165 protrudes from the first bead seat 162 and comes into contact with an inside of the outer bead 201, thereby restricting movement of the outer bead 201 in an inward direction.

The well wall portion 164 extends from the first bead seat 162 or the first movement restriction portions 161 and 165, and is connected to the outer well portion 163a.

The second tire mounting portions 161a, 162a, and 165a are located and spaced apart from the first tire mounting portions 161, 162, 164, and 165, and include a second bead seat 162a coming into contact with an inner bead 202 of the tire 200. In the present embodiment, the second tire mounting portions 161a, 162a, and 165a further include second movement restriction portions 161a and 165a.

The second movement restriction portions 161a and 165a protrude from the second bead seat 162a and come into contact with the inner bead 202, thereby restricting movement of the inner bead 202. In the present embodiment, the second movement restriction portions 161a and 165a include a second rim flange 161a and a second hump 165a.

The second rim flange 161a protrudes from the second bead seat 162a and comes into contact with an outside of the inner bead 202 (that is, a lower side in FIG. 4), thereby restricting movement of the inner bead 202 in an outward direction.

The second hump 165a protrudes from the second bead seat 162a and comes into contact with an inside of the inner bead 202 (that is, an upper side in FIG. 4), thereby restricting movement of the inner bead 202 in an inward direction.

The well portion 163 includes an outer well portion 163a extending from the first tire mounting portions 161, 162, 164, and 165 to the lower side in FIG. 4, and an inner well portion 163b configured to connect the outer well portion 163a to the second tire mounting portions 161a, 162a, and 165a, thereby inclinedly connecting from the outer well portion 163a to a start point of a rounded hump portion r2 of the second hump 165a.

Meanwhile, in the present embodiment, the inner and outer beads 201 and 202 of the tire 200, which comes into surface-contact with the first and second bead seats 162 and 162a, are respectively formed to have thicknesses less than lengths of the first and second bead seats 162 and 162a and thus the well portion 163 enables the inner and outer beads 201 and 202 to be hooked at the first and second humps 165 and 165a.

In the present embodiment, the rim portion 160 of the vehicle wheel is formed to be gradually thinner in the order of the outer well portion 163a, the second bead seat 162a, and the inner well portion 163b. That is, the outer well portion 163a is formed to have a largest thickness T1, the second bead seat 162a is formed to have a next largest thickness T3, and the inner well portion 163b is formed to have a smallest thickness T2 (that is, T1>T3>T2).

Here, the thickness T1 of the outer well portion 163a may be selected with a vertical thickness at an intersecting point between a rounded well portion r1 and the outer well portion 163a, the thickness T2 of the inner well portion 163b may be selected with a vertical thickness at a central point of the inner well portion 163b, and the thickness T3 of the second bead seat 162a may be selected with a central point of the inner bead seat 162a.

Meanwhile, a relationship between the thicknesses T1, T2, and T3 of the outer well portion 163a, the inner well portion 163b, and the second bead seat 162a may be as follows. That is, the thickness T1 of the outer well portion 163a against the thickness T3 of the second bead seat 162a may be formed as 1.2<T1/T3<1.8, and the thickness T1 of the outer well portion 163a against the thickness T2 of the inner well portion 163b may be formed as 1.2<T1/T2<2.5.

Most preferably, as in the following Embodiment 3, the thickness T1 of the outer well portion 163a may be formed with 7.1 mm, the thickness T2 of the inner well portion 163b may be formed with 3.8 mm, and the thickness T3 of the second bead seat 162a may be formed with 5.0 mm such that both stiffness and a weight reduction of the vehicle wheel may be satisfied.

Also, the thicknesses T1, T2, and T3 of the outer well portion 163a, the inner well portion 163b, and the second bead seat 162a are formed in a ratio of 6.0 to 9.1 mm:3.3 to 5.5 mm:4.0 to 7.5 mm, and particularly, the thicknesses T1 and T3 of the outer well portion 163a and the second bead seat 162a are formed to be greater at least 1 mm than the thickness T2 of the inner well portion 163b based on the thickness T2 thereof, which is a smallest thickness, such that a natural frequency of the vehicle wheel may be converted into a high frequency domain.

When the thickness T2 of the inner well portion 163b, which is a criterion of the ratio as described above, is less than 3.3 mm, it may be possible to reduce a weight of the vehicle wheel but it may be difficult to maintain stiffness of the vehicle wheel. Also, when the thickness T2 of the inner well portion 163b exceeds 5.5 mm, the stiffness of the vehicle wheel may be maintained but there is a disadvantage in which the weight of the vehicle wheel is increased.

Further, it may be preferable to form the thickness T2 of the inner well portion 163b as described above to be greater than a thickness difference (that is, T1−T3) between the outer well portion 163a and the second bead seat 162a (that is, T1−T3<T2). This is because of securing a minimum thickness of the inner well portion 163b, which has stiffness relatively weaker than that of each of the outer well portion 163a and the second bead seat 162a, and maintaining the stiffness of the inner well portion 163b to thereby maintain entire stiffness of the rim portion 160 over a set range.

Therefore, each of the thicknesses T1 and T3 of the outer well portion 163a and the second bead seat 162a is set to an optimal range in consideration of the thickness T2 of the inner well portion 163b and the ratio according to the thickness T2 as described above, and a description with respect thereto will be described in detail with reference to embodiments which will be described below.

Meanwhile, the inner well portion 163b is inclinedly formed in the present embodiment, and such an inner well portion 163b includes a first inclined portion 163b-1 formed to be upwardly inclined from the outer well portion 163a to the second bead seat 162a, and a second inclined portion 163b-2 formed to be downwardly inclined from the second bead seat 162a to the first inclined portion 163b-1, thereby being connected to the first inclined portion 163b-1.

The reason for forming the inner well portion 163b to be inclined as the first and second inclined portions 163b-1 and 163b-2 is that, when a thickness of the inner well portion 163b is formed to be thicker, stiffness is improved but an entire weight of the vehicle wheel is increased to cause an opposite result with respect to a weight reduction of the vehicle wheel so that both stiffness and a weight reduction may be satisfied when the inner well portion 163b is formed to be inclined in a two-stepped stage so as to address increase of the entire weight of the vehicle wheel.

Such a first inclined portion 163b-1 and such a second inclined portion 163b-2 of the inner well portion 163b respectively have slope angles θ1 and θ2 for connecting the outer well portion 163a and the second bead seat 162a to the inner well portion 163b by setting each of the thicknesses T1 and T2 of the outer well portion 163a and the second bead seat 162a to a minimum weight, and the slope angle θ1 of the first inclined portion 163b-1 of the inner well portion 163b and the slope angle θ2 of the second inclined portion 163b-2 thereof are formed in a ratio of 5 to 25 degrees:15 to 5 degrees.

Here, the slope angle θ1 of the first inclined portion 163b-1 is an inclined angle between an extension, which is in parallel with a rotational center line O of the vehicle wheel from a bottom surface of the outer well portion 163a, and the inner well portion 163b (that is, the first inclined portion 163b-1).

Also, the slope angle θ2 of the second inclined portion 163b-2 is an inclined angle between an extension, which is in parallel with the rotational center line O of the vehicle wheel from a bottom surface of the second bead seat 162a (that is, the inner bead seat 162a), and the inner well portion 163b (that is, the second inclined portion 163b-2).

Meanwhile, such a slope angle θ2 of the second inclined portion 163b-2 is an alternate angle with respect to a slope angle between an extension, which is in parallel with the rotational center line O of the vehicle wheel from the first inclined portion 163b-1, and the second inclined portion 163b-2, and thus the alternate angle and the slope angle are formed to be the same angle.

A ratio between such slope angles θ1 and θ2 of the first and second inclined portions 163b-1 and 163b-2 is determined by a method in which the slope angle θ2 of the second inclined portion 163b-2 is set based on the slope angle θ1 of the first inclined portion 163b-1.

That is, when the slope angle θ1 of the first inclined portion 163b-1 is 25 degrees, the slope angle θ2 of the second inclined portion 163b-2 corresponds to 5 degrees, and, when the slope angle θ1 of the first inclined portion 163b-1 is 5 degrees, the slope angle θ2 of the second inclined portion 163b-2 corresponds to 15 degrees. An optimal ratio between the slope angles θ1 and θ2 is obtained when the slope angle θ1 of the first inclined portion 163b-1 is 20 degrees and the slope angle θ2 of the second inclined portion 163b-2 is 10.6 degrees.

Particularly, the slope angle θ1 of the first inclined portion 163b-1 is formed to have a maximum slope angle in the range of five times a minimum slope angle, and, when the maximum slope angle exceeds five times the minimum slope angle, a phenomenon in which the inner well portion 163b is abruptly bent occurs such that there is a problem in that durability is degraded.

The slope angle θ2 of the second inclined portion 163b-2, which is determined according to the slope angle θ1 of the first inclined portion 163b-1, is shown in Table 1 as follows.

TABLE 1

| First inclined portion Slope angle | 25 degrees | 20 degrees | 15 degrees | 10 degrees | 5 degrees |
|---|---|---|---|---|---|
| First inclined portion Ratio (θ1) | 1 | 0.8 | 0.6 | 0.4 | 0.2 |
| Second inclined portion Ratio (θ2) | 0.2 × θ1 | 0.5 × θ1 | 1.0 × θ1 | 1.5 × θ1 | 3.0 × θ1 |

As shown in Table 1, the slope angle θ2 of the second inclined portion 163b-2 corresponds to an optimal slope angle for connecting to the inner well portion 163b by setting the thickness T3 of the second bead seat 162a to a minimum weight according to the slope angle θ1 of the first inclined portion 163b-1.

When the slope angles θ1 and θ2 of the first inclined portion 163b-1 and the second inclined portion 163b-2 are formed in such a ratio, a load acting on the rim portion 160 is distributed and thus an abrupt deformation may be prevented.

That is, as shown in FIG. 4, different reaction forces R2-1 and R2-2 respectively act against a load F2 acting on the inner bead seat 162a at the slope angles θ1 and θ2 of the first and second inclined portions 163b-1 and 163b-2.

Therefore, the outer well portion 163a coming into surface-contact with the disc member 100 is formed to be thicker than the inner well portion 163b and the second bead seat 162a, and the inner well portion 163b is inclinedly formed to have two-stepped stages as the first and second inclined portions 163b-1 and 163b-2 and thus, as shown in FIG. 4, an amount of deformation ε2 of the rim portion 160 against loads F1 and F2 acting on the rim portion 160 while the vehicle is driving is less than an amount of deformation ε1 of the vehicle wheel according to the related art (that is, ε1>ε2) so that vibration and noise, which are delivered to the vehicle, may be reduced.

That is, in the present embodiment, the thickness T1 of the outer well portion 163a coming into surface-contact with the disc member 100 is formed to be thicker than the vehicle wheel according to the related art, and the inner well portion 163b is inclinedly formed to have the two-stepped stages as the first and second inclined portions 163b-1 and 163b-2 to distribute the reaction force R2 against the load F2 acting on the inner bead seat 162a to the reaction forces R2-1 and R2-2 which respectively acts at first and second inclined points such that moment due to the load F2 acting on the inner bead seat 162a may be decreased to reduce the amount of deformation ε2.

Embodiment

First, in the present embodiment, a comparison of a weight and stiffness of the vehicle wheel according to a thickness variance of the outer well portion 163a, the inner well portion 163b, and the second bead seat 162a of the rim portion 160 in accordance with the present disclosure and the related art (that is, an example of mass production) is shown in Table 2 as follows.

TABLE 2

| Items | | Outer Well Portion | Inner Well Portion | Second Bead Seat | Order of Thickness | Weight (kg) | Weight Reduction Rate | Stiffness |
|---|---|---|---|---|---|---|---|---|
| The Related Art (Example of Mass Production) | | 5.5 mm | 5.0 mm | 6.0 mm | T3 > T1 > T2 | 13.26 | Comparison weight | 62.5 kN/mm |
| Embodiment of the Present Disclosure | Example 1 | 9.1 mm | 4.2 mm | 5.0 mm | T1 > T3 > T2 | 12.57 | 94.8% | 68.7 kN/mm |
| | Example 2 | 8.1 mm | 3.8 mm | 5.0 mm | T1 > T3 > T2 | 12.34 | 93.1% | 66.5 kN/mm |
| | Example 3 | 7.1 mm | 3.8 mm | 5.0 mm | T1 > T3 > T2 | 12.23 | 92.2% | 64.3 kN/mm |
| | Example 4 | 6.1 mm | 3.8 mm | 5.0 mm | T1 > T3 > T2 | 12.10 | 91.3% | 62.6 kN/mm |
| | Example 5 | 5.5 mm | 3.8 mm | 5.0 mm | T1 > T3 > T2 | 11.90 | 89.7% | 60.8 kN/mm |
| Dimension Range of the Present Disclosure | | 6.0 to 9.1 mm | 3.3 to 5.5 mm | 4.0 to 7.5 mm | T1 > T3 > T2 | | | |

A wheel stiffness test is performed with a single product stiffness test with respect to a vehicle wheel having a weight of 13.26 kg according to the related art and a vehicle wheel having a weight of 12.23 kg (a weight reduction of 1.03 kg) of Embodiment 3 according to the present disclosure, and with a vibration test in a state in which the tire 200 is mounted on each of the two vehicle wheels and then assembled into the vehicle, and a test result is shown in Table 2.

1. Single Product Stiffness Measurement and Data Analysis of Vehicle Wheel in Table 2

1) Explanation of Test

A test title is referred to as an experimental modal analysis (EMA).

EMA is a field for analyzing a dynamic response of a structure by a stimulus, and a response against the stimulus is generated through a data collection device. This is useful for not only verifying a result of a finite-element analysis (FEA) but also determining a modal parameter of a structure.

EMA is a 4-step process for extracting a modal parameter, and procedures with respect to the 4-step process are as follows.

[Vibration Sensor (Accelerometer)]

To record a vibration response of a structure, a vibration sensor, which is referred to as an accelerometer, is provided to attach to an inner lateral surface of the disc member 100 of the vehicle wheel as shown in FIG. 5.

The accelerometer uses an impulse hammer to input vibration and further employs a frequency range, a dynamic range, and the like which are required for a specific test.

[Data Acquisition (Data Collection Device)]

A data collection device is provided to measure a vibration signal being generated through the accelerometer and the impulse hammer.

[Frequency Response Function (FRF) Analysis]

An FRF analysis measures a response when input signals having constant amplitudes and various frequencies are input to a system, and is an analysis method for representing a scale of a response, which is output from the system, with respect to a broadband frequency signal input to the system. The FRF analysis calculates a transfer function of a structure and compares the calculated transfer function with a response against a stimulus, and a result of the FRF analysis represents a response with respect to a size and a phase of the structure in a defined frequency range.

A test result of the FRF analysis is shown in FIG. 6, and a description thereof is as follows.

FIG. 6 is a graph of a resonance frequency and an anti-resonance frequency which occur at the vehicle wheel according to the test result of FIG. 5, and measurement sensors M1 and M2 are attached to the inner lateral surface of the vehicle wheel as shown in FIG. 5.

In such a state, when H11 is defined as a measured value that is measured by the measurement sensor M1 by applying an excitation (that is, an impact) to the measurement sensor M1, H12 is defined as a measured value that is measured by the measurement sensor M1 by applying an excitation (that is, an impact) to the measurement sensor M2, H21 is defined as a measured value that is measured by the measurement sensor M2 by applying an excitation (that is, an impact) to the measurement sensor M1, and H22 is defined as a measured value that is measured by the measurement sensor M2 by applying an excitation (that is, an impact) to the measurement sensor M2, an FRF (that is, a resonance frequency and an anti-resonance frequency) graph of each of the H11, H12, H21, and H22 is represented as in FIG. 6.

Therefore, f1 is an average resonance frequency value of the four measured values H11, H12, H21, and H22, and f2 is an average anti-resonance frequency value of the four measured values H11, H12, H21, and H22.

When $\omega 1 = 2 \times \pi \times f1$ (Hz), $\omega 2 = 2 \times \pi \times f2$ (Hz), and mass=wheel weight (kg), $K_{wheel}$ (Lateral Stiffness) may be obtained using the following equation after an FRF graph of a lateral stiffness is measured.

$$K_{wheel} = \frac{(\omega 1^2 - \omega 2^2) \times \omega 2^2 \times \text{mass}}{\omega 1^2} \quad [\text{Equation}]$$

[Modal Parameter Extraction]

A modal parameter extraction algorithm is used to discriminate a modal parameter from FRF data, and further it is used to detect a peak, calculate a multinomial equation in a frequency domain, and synthesize FRFxx.

2) Test Condition and Stiffness Value

A vehicle wheel stiffness test is performed with a single product stiffness test with respect to a vehicle wheel having a weight of 13.3 kg according to the related art and a vehicle wheel having a weight of 12.2 kg (a weight reduction of 1.1 kg) of Embodiment 3 according to the present disclosure, and with a vibration test in a state in which the tire 200 is mounted on each of the two vehicle wheels and then assembled into the vehicle.

Vehicle wheel of the related art: Size—18X7J and Weight—13.26 kg

Vehicle wheel of Embodiment 3 of the present disclosure: Size—18X7J and Weight—12.23 kg 3) Test Result Vehicle wheel of the related art: Size—18X7J, Weight—13.26 kg, and Stiffness—62.5 kN/mm Vehicle wheel of Embodiment 3 of the present disclosure: Size—18X7J Weight—12.23 kg, and Stiffness—64.3 kN/mm 4) Analysis results of threshold points with respect to upper limit values of a thickness and a weight of the rim portion 160 on the basis of the test result and analysis are shown as in FIGS. 7 to 9.

First, FIG. 7 is a graph of a minimum threshold point analysis with respect to a thickness of an outer well portion of the vehicle wheel, and, as seen from FIG. 7, since the stiffness of the vehicle wheel of the related art is 62.5 kN/mm and the stiffness of the vehicle wheel of the present disclosure is 62.6 kN/mm when the thickness T1 of the outer well portion 163a according to Embodiment 4 of the present disclosure is 6.1 mm, the stiffness of the vehicle wheel of the present disclosure is greater than that of the vehicle wheel of the related art when the thickness T1 of the outer well portion 163a is 6.0 mm or more, such that the thickness T1 of the outer well portion 163a is set to 6.0 mm or more.

FIG. 8 is a graph of a maximum threshold point analysis according to a weight variance of a thickness of the outer well portion of the vehicle wheel, and, as seen from FIG. 8, since the stiffness of the vehicle wheel of the present disclosure is greater than that of the vehicle wheel of the related art when the thickness T1 of the outer well portion 163a is 6.0 mm or more whereas a weight reduction of the vehicle wheel of the present disclosure is less than 5% when the thickness T1 of the outer well portion 163a exceeds 9.1 mm, a maximum value of the thickness T1 of the outer well portion 163a becomes to be equal to or less than 9.1 mm so as to maximize an effect of the weight reduction.

FIG. 9 is a graph illustrating a correlation between a thickness and a weight of an outer well portion of the vehicle wheel and stiffness thereof, and, as seen from FIG. 9, the thickness T1 of the outer well portion 163a of the vehicle wheel according to the present disclosure is set in the range of 6.1 to 9.1 mm such that the stiffness of the vehicle wheel according to the present disclosure may be greater than the stiffness of 62.5 kN/mm of the vehicle wheel according to the related art and further the weight of the vehicle wheel according to the present disclosure may be maximally reduced.

Particularly, when the thickness T1 of the outer well portion 163a is formed in the range of 6.1 to 8.1 mm, it becomes an optimal thickness capable of enabling the stiffness of the vehicle wheel of the present disclosure to be equal to or greater than that of the vehicle wheel of the related art and reducing the weight of the vehicle wheel of the present disclosure in the range of approximately 6 to 9% compared to that of the vehicle wheel of the related art.

Therefore, through the above described test result, it may be a most suitable thickness ratio in which the thickness T1 of the outer well portion 163a is formed with 7.1 mm, the thickness T2 of the inner well portion 163b is formed with 3.8 mm, and the thickness T3 of the second bead seat 162a is formed with 5.0 mm such that both the stiffness and the weight reduction of the vehicle wheel may be satisfied.

2. Consideration of stiffness according to variance of the slope angles θ1 and θ2 of the first and second inclined portions 163b-1 and 163b-2 of the inner well portion 163b First, the correlation between the slope angles θ1 and θ2 of the first and second inclined portions 163b-1 and 163b-2 of the inner well portion 163b has been described with reference to Table 1, and hereinafter, a weight and stiffness according to maximum, minimum, and optimal angles of the slope angles θ1 and θ2 will be described.

As seen from Table 3 described below and FIG. 10, when the slope angle θ1 of the first inclined portion 163b-1 is a maximum angle of 25 degrees, the slope angle θ2 of the second inclined portion 163b-2 becomes a minimum angle of 5 degrees, and, when the slope angle θ1 of the first inclined portion 163b-1 is a minimum angle of 5 degrees, the slope angle θ2 of the second inclined portion 163b-2 becomes a maximum angle of 15 degrees.

Therefore, when an optimal slope angle θ1 of the first inclined portion 163b-1 is 20 degrees and an optimal slope angle θ2 of the second inclined portion 163b-2 is 10 degrees, the inner well portion 163b having the first and second inclined portions 163b-1 and 163b-2 is formed in a substantially straight line.

Particularly, when the slope angle θ1 of the first inclined portion 163b-1 is the maximum angle and the slope angle θ2 of the second inclined portion 163b-2 is the minimum angle, a weight is increased because an outer diameter of the wheel is larger than an optimal slope angle, and, when the slope angle θ1 of the first inclined portion 163b-1 is the minimum angle and the slope angle θ2 of the second inclined portion 163b-2 is the maximum angle, the weight is heavier than when the optimal slope angle is applied in spite that the outer diameter of the wheel is smaller than the optimal slope angle (See, Table 4 and FIG. 11).

As seen from Table 4 and FIG. 11, comparing to when the slope angles θ1 and θ2 of the first and second inclined portions 163b-1 and 163b-2 respectively have the optimal angle, when the slope angle θ1 of the first inclined portion 163b-1 is the maximum angle and the slope angle θ2 of the second inclined portion 163b-2 is the minimum angle, the stiffness is increased by a small amount whereas the weight is significantly increased.

Also, when the slope angle θ1 of the first inclined portion 163b-1 is the minimum angle and the slope angle θ2 of the second inclined portion 163b-2 is the maximum angle, it can be seen that the stiffness is weaker and further the weight is heavier than when the slope angles θ1 and θ2 respectively have the optimal angle.

TABLE 3

| Items | Maximum θ1 and minimum θ2 | Optimal θ1 and θ2 | Minimum θ1 and maximum θ2 |
|---|---|---|---|
| First inclined portion (θ1) | 25 | 20 | 5 |
| Second inclined portion (θ2) | 5 | 10 | 15 |

TABLE 4

| Items | Maximum θ1 - 12.55 kg | Optimal θ1 - 12.23 kg | Minimum θ1 - 12.29 kg |
|---|---|---|---|
| Weight | 12.55 | 12.23 | 12.29 |
| Stiffness | 64.7 | 64.3 | 64.2 |

3. Physical Vehicle Vibration Test and Data Analysis by mounting each of the vehicle wheels of the related art and Embodiment 3 of the present disclosure on the vehicle 1) Test Condition Test Purpose and Background: Evaluation of effect related to vibration according to variance of a weight and a rim thickness of each of the vehicle wheels of the related art and Embodiment 3 of the present disclosure Evaluation Vehicle: GM TRAX Tire Pressure: 35 Psi (2.46 kgf/cm$^2$)

Evaluation Road Surface/Speed: Smooth Asphalt/100 KPH

Applied Tire/Vehicle Wheel: P215/55R18/18X7J 13 kg (the related art), 18X7J 12 kg (the present disclosure)

Evaluation Item: Smooth Asphalt Vibration Measurement

Evaluation Position: Knuckle Portion, Floor Portion of Vehicle Body, and Steering Portion In this test, vibration sensors are respectively installed at a handle (that is, steering) portion of a driver seat, a knuckle portion of a vehicle wheel, and a floor portion of the driver seat, and a heavy vehicle wheel of the related art and a vehicle wheel, which is reduced in weight of 1 kg than the vehicle wheel of the related art, according to Embodiment 3 of the present disclosure are respectively mounted on the evaluation vehicle to measure and evaluate vibration influence while the evaluation vehicle is driving.

As seen from graphs shown in FIGS. 13 and 14, in spite that the vehicle wheel according to Embodiment 3 of the present disclosure is reduced in weight of 1.03 kg than the vehicle wheel of the related art, influence including vibration and the like, which are delivered to a spoke portion of the vehicle wheel, is absorbed at the outer well portion 163*a* due to an increase in thickness of the outer well portion 163*a* than in case of the related art such that it may be verified that a vibration value is reduced at a peak value of a rotational frequency of a tire.

Therefore, when the rim portion 160 of the vehicle wheel is configured according to the present disclosure, it can be seen that degradation of stiffness due to a weight reduction of the vehicle wheel and influence of vibration and noise due to the degradation of stiffness may be minimized.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A vehicle wheel comprising:
a disc member to which an axle is connected; and
a rim portion connected to the disc member and on which a tire is mounted,
wherein the rim portion includes:
a first tire mounting portion connected to the disc member and including a first bead seat coming into contact with an outer bead of the tire;
a second tire mounting portion located and spaced apart from the first tire mounting portion and including a second bead seat coming into contact with an inner bead of the tire; and
a well portion including an outer well portion extending from the first tire mounting portion, and an inner well portion configured to connect the outer well portion to the second tire mounting portion, and
wherein a thickness is formed to be thinner in an order of the outer well portion, the second bead seat, and the inner well portion;
wherein the thickness of the outer well portion is 1.2 to 1.8 times that of the second bead seat;
wherein the thickness of the outer well portion is 1.2 to 2.5 times that of the inner well portion;
wherein the inner well portion is formed to be inclined in an outward direction of the outer well portion based on a rotational center of the disc member;
wherein the inner well portion is formed to be inclined in multi-stepped stages;
wherein the inner well portion includes:
a first inclined portion formed to be inclined from the outer well portion to the second bead seat; and
a second inclined portion formed to be inclined from the second bead seat to the first inclined portion and connected to the first inclined portion;
wherein an inclined angle between the bottom surface of the second bead seat and the second inclined portion is the same as a slope angle between the rotational center line of the disc member and the second inclined portion.

2. The vehicle wheel of claim 1, wherein the first tire mounting portion further includes:
a first movement restriction portion protruding from the first bead seat and configured to come into contact with the outer bead to restrict movement of the outer bead; and
a well wall portion extending from the first bead seat or the first movement restriction portion and connected to the outer well portion.

3. The vehicle wheel of claim 2, wherein the first movement restriction portion includes a first rim flange and a first hump, wherein:
the first rim flange protrudes from the first bead seat and configured to come into contact with an outside of the outer bead to restrict movement of the outer bead in an outward direction; and
the first hump protrudes from the first bead seat and configured to come into contact with an inside of the outer bead to restrict movement of the outer bead in an inward direction.

4. The vehicle wheel of claim 1, wherein the second tire mounting portion further includes a second movement restriction portion protruding from the second bead seat and configured to come into contact with the inner bead to restrict movement of the inner bead.

5. The vehicle wheel of claim 4, wherein the second movement restriction portion includes a second rim flange and a second hump, wherein:
the second rim flange protrudes from the second bead seat and configured to come into contact with an outside of the inner bead to restrict movement of the inner bead in an outward direction; and
the second hump protrudes from the second bead seat and configured to come into contact with an inside of the inner bead to restrict movement of the inner bead in an inward direction.

6. The vehicle wheel of claim 1, wherein the thicknesses of the outer well portion, the inner well portion, the second bead seat are 6.0 to 9.1 mm, 3.3 to 5.5 mm, and 4.0 to 7.5 mm, respectively.

7. The vehicle wheel of claim 1, wherein the thickness of the inner well portion is greater than a thickness difference between the outer well portion and the second bead seat.

8. The vehicle wheel of claim 1, wherein a slope angle of the first inclined portion is in a range of 5 to 25 degrees.

9. The vehicle wheel of claim 8, wherein a slope angle of the second inclined portion is in a range of 5 to 15 degrees.

* * * * *